US006417581B2

(12) United States Patent
Hall et al.

(10) Patent No.: US 6,417,581 B2
(45) Date of Patent: Jul. 9, 2002

(54) CIRCUIT FOR AUTOMATICALLY INVERTING ELECTRICAL LINES CONNECTED TO A DEVICE UPON DETECTION OF A MISWIRED CONDITION TO ALLOW FOR OPERATION OF DEVICE EVEN IF MISWIRED

(75) Inventors: Philip R. Hall, Ottsville, PA (US); William S. Richie, Jr., Pennsville, NJ (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/852,248

(22) Filed: May 9, 2001

Related U.S. Application Data

(63) Continuation of application No. 09/287,935, filed on Apr. 7, 1999, now Pat. No. 6,252,756.
(60) Provisional application No. 60/101,018, filed on Sep. 18, 1998.

(51) Int. Cl.[7] .................................................. H02J 4/00

(52) U.S. Cl. ....................................... 307/127; 361/246
(58) Field of Search ................................ 361/245, 246; 307/127

(56) References Cited

U.S. PATENT DOCUMENTS 2,264,495 A 12/1941 Wilner
2,879,395 A 3/1959 Walkup
3,711,743 A 1/1973 Bolasny
3,714,531 A 1/1973 Takahashi
3,936,698 A 2/1976 Meyer
4,092,543 A 5/1978 Levy
4,282,601 A * 8/1981 Flora ........................... 375/20
4,423,462 A 12/1983 Antonevich
4,434,324 A * 2/1984 Boggio et al. ............ 178/69 R
4,435,195 A 3/1984 Testone
4,473,757 A 9/1984 Farago et al.
4,476,514 A 10/1984 Mykkanen
4,477,263 A 10/1984 Shaver et al.
4,528,612 A 7/1985 Spengler (List continued on next page.)

OTHER PUBLICATIONS

Ionization and the Semiconductor Industry; SIMCO, an Illinois Tool Works Company; 1977; pp. 1–35.
Industrial Product Catalog 1998–1999; SIMCO, an Illinois Tool Works Company; 1998; pp. 1–33.
A Basic Guide to an ESD Control Program for Electronics Manufacturers; SIMCO, an Illinois Tool Works Company; 1995; pp. 1–12.
Aerostat® PC™ Personalized Coverage Ionizing Air Blower; SIMCO, an Illinois Tool Works Company; 1997; 2 pages.
Aerostat® Guardian™ Overhead Ionizer; SIMCO, an Illinois Tool Works Company; 1997; 2 pages.
Aerostat® Guardian™ CR Overhead Ionizer; SIMCO, an Illinois Tool Works Company; 1998; 2 pages.
EA–3 Charges Plate Monitor; SIMCO, an Illinois Tool Works Company; 1997; 2 pages.
Product Specification, Hand–E–Electrostatic Fieldmeter; SIMCO, an Illinois Tool Works Company; 1996; 1 page.

(List continued on next page.)

*Primary Examiner*—Fritz Fleming
(74) *Attorney, Agent, or Firm*—Akin, Gump, Strauss, Hauer & Feld, L.L.P.

(57) ABSTRACT

Circuitry is provided in a device to automatically change the relative position of the electrical lines which enter the device upon detection of a miswired condition. More specifically, the circuitry allows the device to function normally even if an installer accidentally inverts (i.e., flips or reverses) the wiring connections when attaching connectors to a communication/power line of the device. In this manner, the installer does not need to rewire the lines.

4 Claims, 11 Drawing Sheets

U.S. PATENT DOCUMENTS

| | | | |
|---|---|---|---|
| 4,542,434 A | | 9/1985 | Gehlke et al. |
| 4,630,167 A | | 12/1986 | Huggins |
| 4,642,728 A | | 2/1987 | Unger |
| 4,740,862 A | | 4/1988 | Halleck |
| 4,757,421 A | | 7/1988 | Mykkanen |
| 4,757,422 A | | 7/1988 | Bossard et al. |
| 4,785,248 A | | 11/1988 | Mykkanen et al. |
| 4,809,127 A | | 2/1989 | Steinman et al. |
| 4,829,398 A | | 5/1989 | Wilson |
| 4,872,083 A | | 10/1989 | Blitshteyn |
| 4,878,149 A | | 10/1989 | Stiehl et al. |
| 4,901,194 A | | 2/1990 | Steinman et al. |
| 4,951,172 A | | 8/1990 | Steinman et al. |
| 4,974,115 A | | 11/1990 | Breidegam et al. |
| 5,008,594 A | | 4/1991 | Swanson et al. |
| 5,047,892 A | | 9/1991 | Sakata et al. |
| 5,055,963 A | | 10/1991 | Partridge |
| 5,057,966 A | | 10/1991 | Sakata et al. |
| 5,153,811 A | | 10/1992 | Rodrigo et al. |
| 5,182,466 A | | 1/1993 | Ohkubo |
| 5,247,420 A | | 9/1993 | Bakhoum |
| 5,467,369 A | * | 11/1995 | Vijeh et al. .................. 375/24 |

OTHER PUBLICATIONS

Aerostat® XC Extended Coverage Ionizing Air Blower; SIMCO, an Illinois Tool Works Company; 1997; 2 pages.
IntelliStat™ 48 Overhead Ionizer; SIMCO, an Illinois Tool Works Company; 1998; 2 pages.
Air Ring® 1000 Ionizer; SIMCO, an Illinois Tool Works Company; 1998; 2 pages.
QwikTrac® Ionization Bar; SIMCO, an Illinois Tool Works Company; 1998; 2 pages.
PulseBar® Static Neutralization Bars; SIMCO, an Illinois Tool Works Company; 1997; 2 pages.
CleanTrac™ Ultra–Clean Ionization Bar; SIMCO, an Illinois Tool Works Company; 1998; 2 pages.
CleanTrac® Ultra–Clean Ionization Bar; SIMCO, an Illinois Tool Works Company; 1997; 2 pages.

* cited by examiner

EMITTER MODULE SOFTWARE OPERATION

CIRCUIT FOR AUTOMATICALLY INVERTING ELECTRICAL LINES CONNECTED TO A DEVICE UPON DETECTION OF A MISWIRED CONDITION TO ALLOW FOR OPERATION OF DEVICE EVEN IF MISWIRED

CROSS-REFERENCE TO RELATED APPLICATIONS

This application is a continuation of application Ser. No. 09/287,935 filed Apr. 7, 1999 entitled "LOW VOLTAGE ROOM IONIZATION SYSTEM," the entire disclosure of which is incorporated herein by reference, now U.S. Pat. No. 6,252,756 filed Jun. 26, 2001.

This application claims the benefit of U.S. Provisional Application No. 60/101,018 filed Sep. 18, 1998 entitled "LOW VOLTAGE MODULAR ROOM IONIZATION SYSTEM."

BACKGROUND OF THE INVENTION

Controlling static charge is an important issue in semiconductor manufacturing because of its significant impact on the device yields. Device defects caused by electrostatically attracted foreign matter and electrostatic discharge events contribute greatly to overall manufacturing losses.

Many of the processes for producing integrated circuits use non-conductive materials which generate large static charges and complimentary voltage on wafers and devices.

Air ionization is the most effective method of eliminating static charges on non-conductive materials and isolated conductors. Air ionizers generate large quantities of positive and negative ions in the surrounding atmosphere which serve as mobile carriers of charge in the air. As ions flow through the air, they are attracted to oppositely charged particles and surfaces. Neutralization of electrostatically charged surfaces can be rapidly achieved through the process.

Air ionization may be performed using electrical ionizers which generate ions in a process known as corona discharge. Electrical ionizers generate air ions through this process by intensifying an electric field around a sharp point until it overcomes the dielectric strength of the surrounding air. Negative corona occurs when electrons are flowing from the electrode into the surrounding air. Positive corona occurs as a result of the flow of electrons from the air molecules into the electrode.

To achieve the maximum possible reduction in static charges from an ionizer of a given output, the ionizer must produce equal amounts of positive and negative ions. That is, the output of the ionizer must be "balanced." If the ionizer is out of balance, the isolated conductor and insulators can become charged such that the ionizer creates more problems than it solves. Ionizers may become imbalanced due to power supply drift, power supply failure of one polarity, contamination of electrodes, or degradation of electrodes. In addition, the output of an ionizer may be balanced, but the total ion output may drop below its desired level due to system component degradation.

Accordingly, ionization systems incorporate monitoring, automatic balancing via feedback systems, and alarms for detecting uncorrected imbalances and out-of-range outputs. Most feedback systems are entirely or primarily hardware-based. Many of these feedback systems cannot provide very fine balance control, since feedback control signals are fixed based upon hardware component values. Furthermore, the overall range of balance control of such hardware-based feedback systems may be limited based upon the hardware component values. Also, many of the hardware-based feedback systems cannot be easily modified since the individual components are dependent upon each other for proper operation.

A charged plate monitor is typically used to calibrate and periodically measure the actual balance of an electrical ionizer, since the actual balance in the work space may be different from the balance detected by the ionizer's sensor.

The charged plate monitor is also used to periodically measure static charge decay time. If the decay time is too slow or too fast, the ion output may be adjusted by increasing or decreasing the preset ion current value. This adjustment is typically performed by adjusting two trim potentiometers (one for positive ion generation and one for negative ion generation). Periodic decay time measurements are necessary because actual ion output in the work space may not necessarily correlate with the expected ion output for the ion output current value set in the ionizer. For example, the ion output current may be initially set at the factory to a value (e.g., 0.6 $\mu$A) so as to produce the desired amount of ions per unit time. If the current of a particular ionizer deviates from this value, such as a decrease from this value due to particle buildup on the emitter of the ionizer, then the ionizer high voltage power supply is adjusted to restore the initial value of ion current.

A room ionization system typically includes a plurality of electrical ionizers connected to a single controller. FIG. 1 (prior art) shows a conventional room ionization system 10 which includes a plurality of ceiling-mounted emitter modules $\mathbf{12}_1$-$\mathbf{12}_n$ (also, referred to as "pods") connected in a daisy-chain manner by signal lines 14 to a controller 16. Each emitter module 12 includes an electrical ionizer 18 and communications/control circuitry 20 for performing limited functions, including the following functions:

(1) TURN ON/OFF;

(2) send an alarm signal to the controller 16 through a single alarm line within the signal lines 14 if a respective emitter module 12 is detected as not functioning properly.

One significant problem with the conventional system of FIG. 1 is that there is no "intelligent" communication between the controller 16 and the emitter modules $\mathbf{12}_1$–$\mathbf{12}_n$. In one conventional scheme, the signal line 14 has four lines; power, ground, alarm and ON/OFF control. The alarm signal which is transmitted on the alarm line does not include any information regarding the identification of the malfunctioning emitter module 12. Thus, the controller 16 does not know which emitter module 12 has malfunctioned when an alarm signal is received. Also, the alarm signal does not identify the type of problem (e.g., bad negative or positive emitter, balance off). Thus, the process of identifying which emitter module 12 sent the alarm signal and what type of problem exists is time-consuming.

Yet another problem with conventional room ionization systems is that there is no ability to remotely adjust parameters of the individual emitter modules 12, such as the ion output current or balance from the controller 16. These parameters are typically adjusted by manually varying settings via analog trim potentiometers on the individual emitter modules 12. (The balances on some types of electrical ionizers are adjusted by pressing (+)/(−) or UP/DOWN buttons which control digital potentiometer settings.) A typical adjustment session for the conventional system 10 having ceiling mounted emitter modules 12 is as follows:

(1) Detect an out-of-range parameter via a charged plate monitor;

(2) Climb up on a ladder and adjust balance and/or ion output current potentiometer settings;

(3) Climb down from the ladder and remove the ladder from the measurement area.

(4) Read the new values on the charged plate monitor;

(5) Repeat steps (1)–(4), if necessary.

The manual adjustment process is time-consuming and intrusive. Also, the physical presence of the operator in the room interferes with the charge plate readings.

Referring again to FIG. 1, the signal lines 14 between respective emitter modules 12 consist of a plurality of wires with connectors crimped, soldered, or otherwise attached, at each end. The connectors are attached in the field (i.e., during installation) since the length of the signal line 14 may vary between emitter modules 12. That is, the length of the signal line 14 between emitter module 121 and 122 may be different from the length of the signal line 14 between emitter module 123 and 124. By attaching the connectors in the field, the signal lines 14 may be set to exactly the right length, thereby resulting in a cleaner installation.

One problem which occurs when attaching connectors in the field is that the connectors are sometimes put on backwards. The mistake may not be detected until the entire system is turned on. The installer must then determine which connector is on backwards and must fix the problem by rewiring the connector.

The conventional room ionization system 10 may be either a high voltage or low voltage system. In a high voltage system, a high voltage is generated at the controller 16 and is distributed via power cables to the plurality of emitter modules 12 for connection to the positive and negative emitters. In a low voltage system, a low voltage is generated at the controller 16 and is distributed to the plurality of emitter modules 12 where the voltage is stepped up to the desired high voltage for connection to the positive and negative emitters. In either system, the voltage may be AC or DC. If the voltage is DC, it may be either steady state DC or pulse DC. Each type of voltage has advantages and disadvantages.

One deficiency of the conventional system 10 is that all emitter modules 12 must operate in the same mode. Thus, in a low voltage DC system, all of the emitter modules 12 must use steady state ionizers or pulse ionizers.

Another deficiency in the conventional low voltage DC system 10 is that a linear regulator is typically used for the emitter-based low voltage power supply. Since the current passing through a linear regulator is the same as the current at its output, a large voltage drop across the linear regulator (e.g., 25 V drop caused by 30 V in/5 V out) causes the linear regulator to draw a significant amount of power, which, in turn, generates a significant amount of heat. Potential overheating of the linear regulator thus limits the input voltage, which in turn, limits the amount of emitter modules that can be connected to a single controller 16. Also, since the power lines are not lossless, any current in the line causes a voltage drop across the line. The net effect is that when linear regulators are used in the emitter modules 12, the distances between successive daisy-chained emitter modules 12, and the distance between the controller 16 and the emitter modules 12 must be limited to ensure that all emitter modules 12 receive sufficient voltage to drive the module-based high voltage power supplies.

Accordingly, there is an unmet need for a room ionization system which allows for improved flexibility and control of, and communication with, emitter modules. There is also an unmet need for a scheme which automatically detects and corrects the miswire problem in an easier manner. There is also an unmet need for a scheme which allows individualized control of the modes of the emitter modules. The present invention fulfills these needs.

BRIEF SUMMARY OF THE PRESENT INVENTION

The present invention provides a circuit for changing the relative position of wired electrical lines which are in a fixed relationship to each other, wherein the wired electrical lines include a first communication line and a second communication line. The circuit comprises a first switch associated with the first communication line, a second switch associated with the second communication line, and a processor having an output control signal connected to the first and second switches. The first switch has a first, initial position and a second position which is opposite of the first, initial position. Likewise, the second switch has a first, initial position and a second position which is opposite of the first, initial position. The output control signal of the processor causes the first and second switches to be placed in their respective first or second position, wherein the first and second communication lines have a first configuration when both are in their first, initial position and a second configuration when both are in their second position.

BRIEF DESCRIPTION OF THE DRAWINGS

The following detailed description of preferred embodiments of the present invention would be better understood when read in conjunction with the appended drawings. For the purpose of illustrating the present invention, there is shown in the drawings embodiments which are presently preferred. However, the present invention is not limited to the precise arrangements and instrumentalities shown. In the drawings:

FIGS. 3B-1 and 3B-2, taken together (hereafter, referred to as "FIG. 3B"), are a detailed circuit level diagram of FIG. 3A;

DETAILED DESCRIPTION OF THE INVENTION

Figures 1, 2:
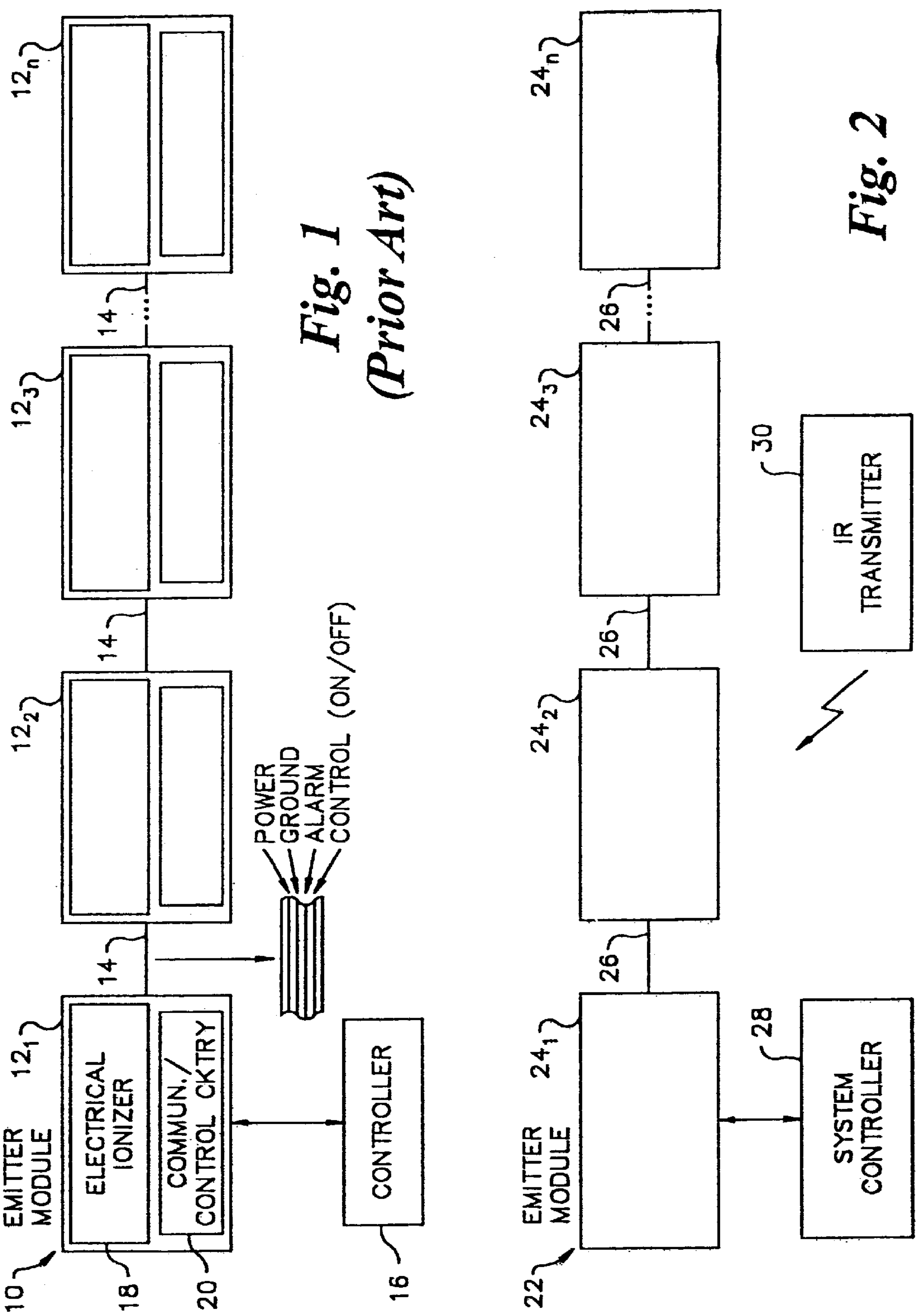
Fig. 1 (Prior Art)
FIG. 1 is a prior art schematic block diagram of a conventional room ionization system.
FIG. 2 is a schematic block diagram of a room ionization system in accordance with the present invention.

Certain terminology is used herein for convenience only and is not to be taken as a limitation on the present invention.

In the drawings, the same reference letters are employed for designating the same elements throughout the several figures.

FIG. 2 is a modular room ionization system 22 in accordance with the present invention. The system 22 includes a plurality of ceiling-mounted emitter modules $\mathbf{24_1}$-$\mathbf{24_n}$ connected in a daisy-chain manner by RS-485 communication/power lines 26 to a system controller 28. In one embodiment of the present invention, a maximum of ten emitter modules 24 are daisy-chained to a single system controller 28, and successive emitter modules 24 are about 7–12 feet apart from each other. Each emitter module 24 includes an electrical ionizer and communications/control circuitry, both of which are illustrated in more detail in FIG. 4. The system 22 also includes an infrared (IR) remote control transmitter 30 for sending commands to the emitter modules 24. The circuitry of the transmitter 30 is shown in more detail in FIGS. 3A and 3B. The circuitry of the system controller 28 is shown in more detail in FIG. 6.

The system 22 provides improved capabilities over conventional systems, such as shown in FIG. 1. Some of the improved capabilities are as follows:

(1) Both balance and ion output of each emitter module 24 can be individually adjusted. Each emitter module 24 may be individually addressed via the remote control transmitter 30 or through the system controller 28 to perform such adjustments. Instead of using analog-type trim potentiometers, the emitter module 24 uses a digital or electronic potentiometer or a D/A converter. The balance and ion current values are stored in a memory location in the emitter module and are adjusted via software control. The balance value (which is related to a voltage value) is stored in memory as $B_{REF}$, and the ion current is stored in memory as $C_{REF}$.

(2) The balance and ion output adjustments may be performed via remote control. Thus, individual emitter modules 24 may be adjusted while the user is standing outside of the "keep out" zone during calibration and setup, while standing close enough to read the charged plate monitor.

(3) The emitter modules 24 send identification information and detailed alarm condition information to the system controller 28 so that diagnosis and correction of problems occur easier and faster than in conventional systems. For example, the emitter module $\mathbf{24_3}$ may send an alarm signal to the system controller 28 stating that the negative emitter is bad, the positive emitter is bad, or that the balance is off.

(4) A miswire protection circuitry built into each emitter module 24 allows for the installer to flip or reverse the RS-485 communication/power lines 26. The circuitry corrects itself if the lines are reversed, thereby eliminating any need to rewire the lines. In conventional signal lines, no communications or power delivery can occur if the lines are reversed.

(5) The mode of each emitter module 24 may be individually set. Thus, some emitter modules 24 may operate in a steady state DC mode, whereas other emitter modules 24 may operate in a pulse DC mode.

(6) A switching power supply (i.e., switching regulator) is used in the emitter modules 24 instead of a linear regulator. The switching power supply lessens the effects of line loss, thereby allowing the system controller 28 to distribute an adequate working voltage to emitter modules 24 which may be far apart from each other and/or far apart from the system controller 28. The switching power supply is more efficient than a linear power supply because it takes off the line only the power that it needs to drive the output. Thus, there is less voltage drop across the communication/power line 26, compared with a linear power supply. Accordingly, smaller gauge wires may be used. The switching power supply allows emitter modules 24 to be placed further away from each other, and further away from the system controller 28, than in a conventional low voltage system.

Specific components of the system 22 are described below.

Figure 3A:
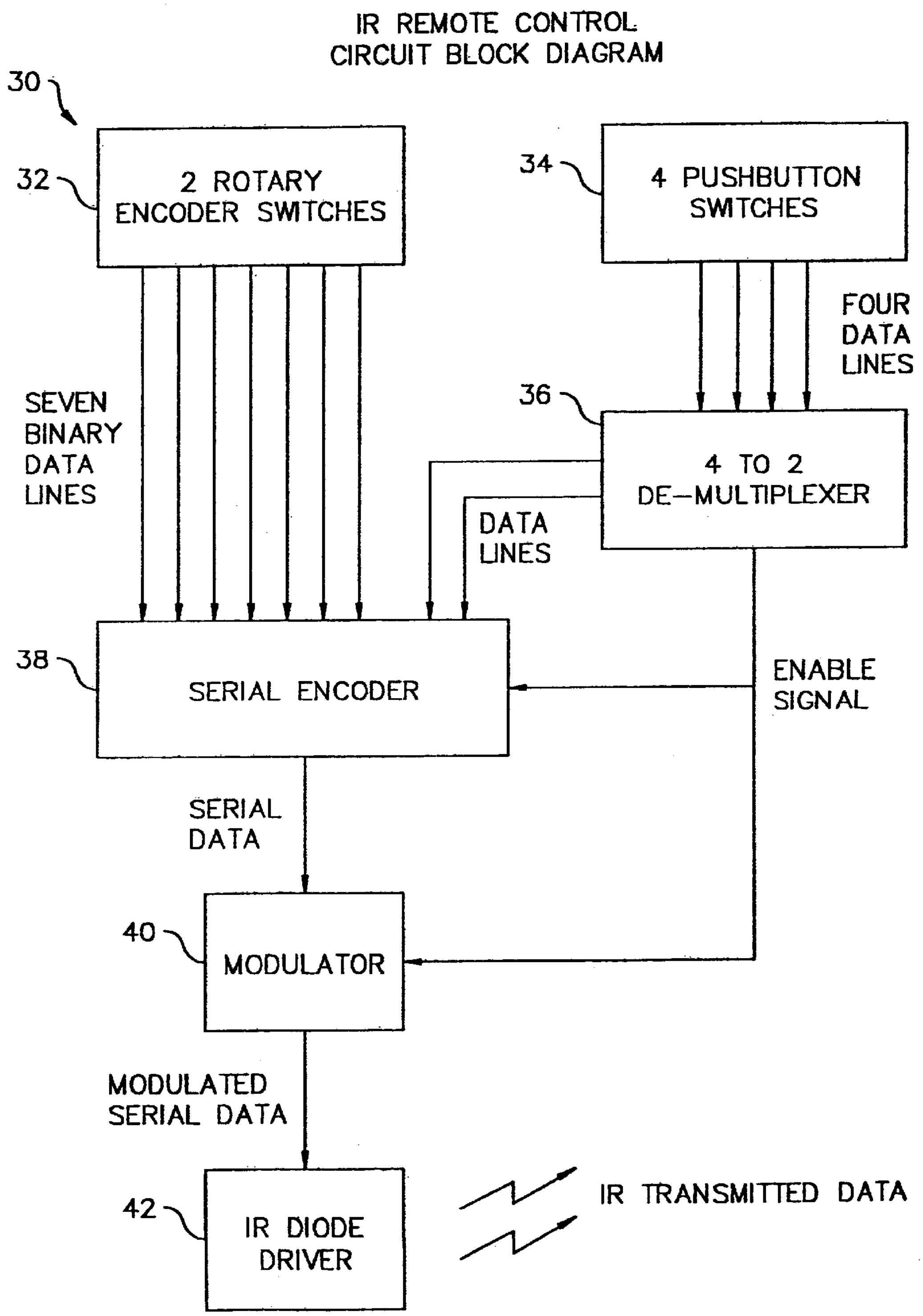
FIG. 3A is a schematic block diagram of an infrared (IR) remote control transmitter circuit for the room ionization system of FIG. 2.

FIG. 3A shows a schematic block diagram of the remote control transmitter 30. The transmitter 30 includes two rotary encoding switches 32, four pushbutton switches 34, a 4:2 demultiplexer 36, a serial encoder 38, a frequency modulator 40 and an IR drive circuit 42. The rotary encoder switches 32 are used to produce seven binary data lines that are used to "address" the individual emitter modules 24. The four pushbutton switches 34 are used to connect power to the circuitry and create a signal that passes through the 4:2 demultiplexer 36.

The 4:2 demultiplexer 36 comprises two 2 input NAND gates and one 4 input NAND gate. Unlike a conventional 4:2 demultiplexer which produces two output signals, the demultiplexer 36 produces three output signals, namely, two data lines and one enable line. The "enable" signal (which is not produced by a conventional 4:2 demultiplexer), is produced when any of the four inputs are pulled low as a result of a pushbutton being depressed. This signal is used to turn on a LED, and to enable the encoder and modulator outputs.

The seven binary data lines from the rotary encoder switches 32, and the two data lines and the enable line from the demultiplexer 36, are passed to the serial encoder 38 where a serial data stream is produced. The modulator 40 receives the enable line from the demultiplexer 36 and the serial data from the encoder 38, and creates a modulated signal. The modulated signal is then passed to the IR diode driver for transmitting the IR information.

Figures 1, 3B:
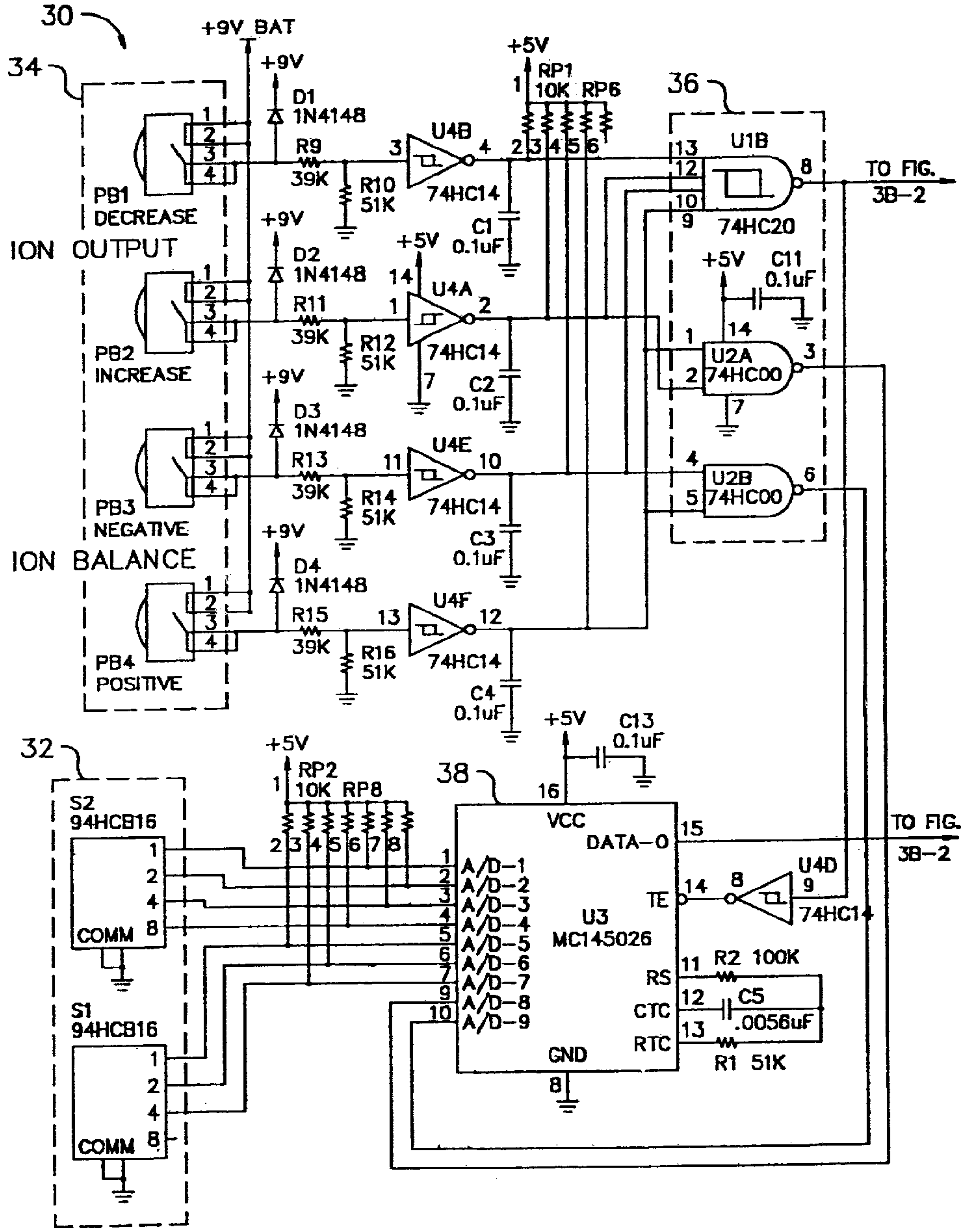
Figures 2, 3B:
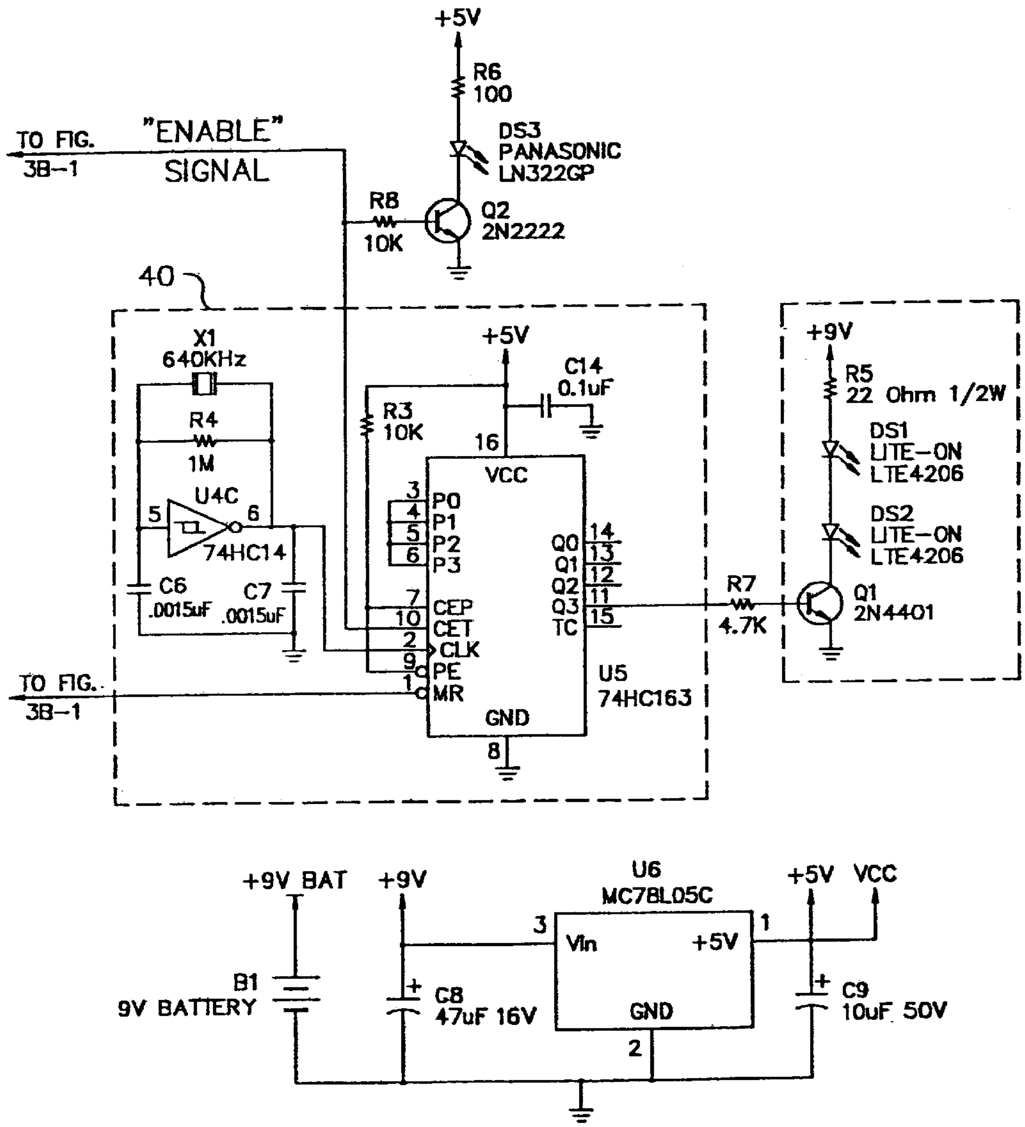

FIG. 3B is a circuit level diagram of FIG. 3A.

Figure 4:
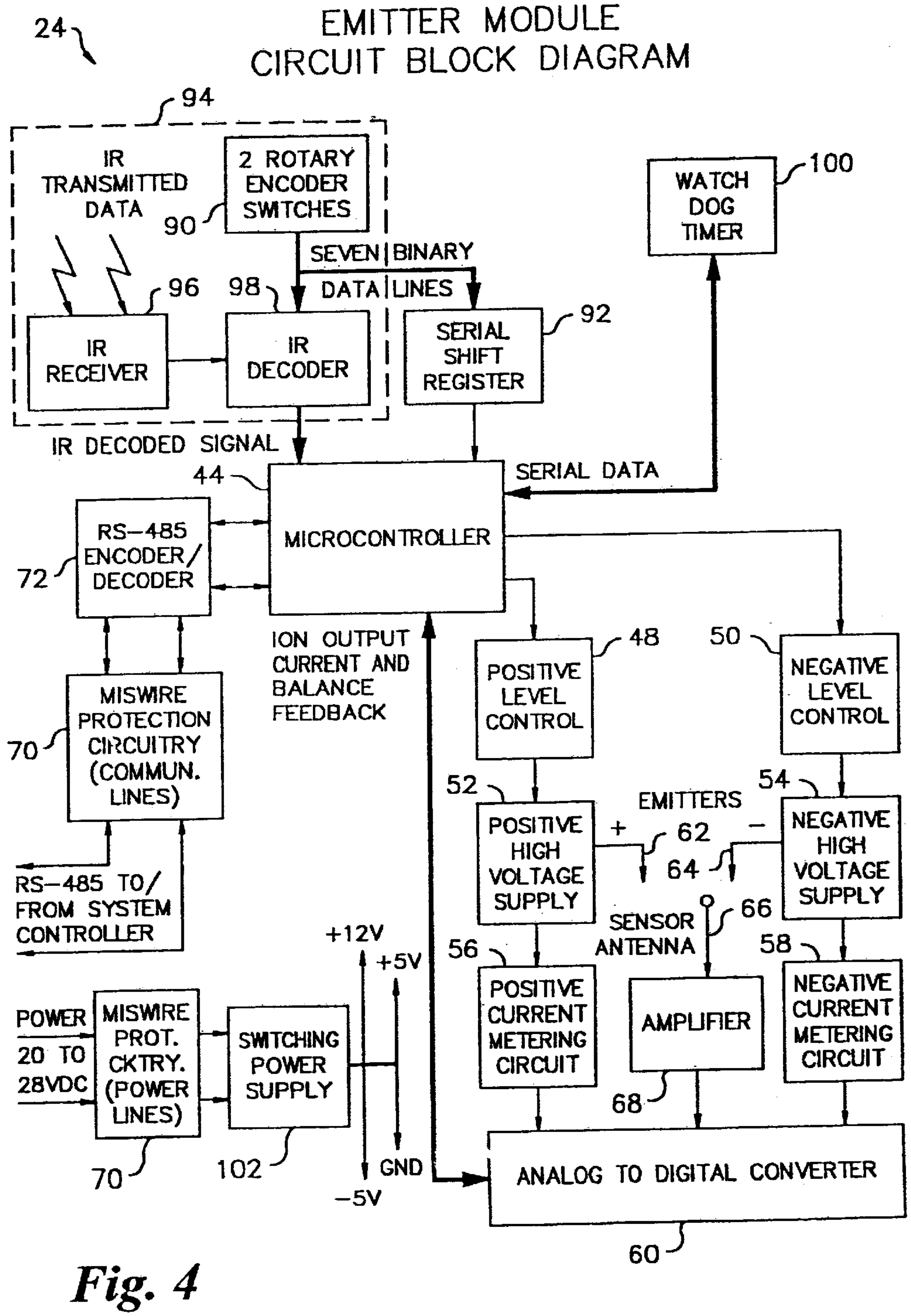
FIG. 4 is a schematic block diagram of an emitter module for the room ionization system of FIG. 2.

FIG. 4 shows a schematic block diagram of one emitter module 24. The emitter module 24 performs at least the following three basis functions; produce and monitor ions, communicate with the system controller 28, and receive IR data from the transmitter 30.

The emitter module 24 produces ions using a closed loop topology including three input paths and two output paths. Two of the three input paths monitor the positive and negative ion current and include a current metering circuit 56 or 58, a multi-input A/D converter 60, and the microcontroller 44. The third input path monitors the ion balance and includes a sensor antenna 66, an amplifier 68, the multi-input A/D converter 60, and the microcontroller 44. The two output paths control the voltage level of the high-voltage power supplies 52 or 54 and include the microcontroller 44, a digital potentiometer (or D/A converter as a substitute therefor), an analog switch, high-voltage power supply 52 or 54, and an output emitter 62 or 64. The digital potentiometer and the analog switch are part of the level control 48 or 50.

In operation, the microcontroller 44 holds a reference ion output current value, $C_{REF}$, obtained from the system controller 28. The microcontroller 44 then compares this value with a measured or actual value, $C_{MEAS}$, read from the A/D converter 60. The measured value is obtained by averaging the positive and negative current values. If $C_{MEAS}$ is different than $C_{REF}$, the microcontroller 44 instructs the digital potentiometers (or D/A's) associated with the positive and negative emitters to increase or decrease their output by the same, or approximately the same, amount. The analog switches of the positive level controls 48, 50 are controlled by the microcontroller 44 which turns them on constantly for steady state DC ionization, or oscillates the switches at varying rates, depending upon the mode of the emitter module. The output signals from the analog switches are then passed to the positive and negative high voltage power supplies 52, 54. The high voltage power supplies 52, 54 take in the DC signals and produce a high voltage potential on the ionizing emitter points 62, 64. As noted above, the return path for the high voltage potential is connected to the positive or negative current metering circuits 56, 58. The current metering circuits 56, 58 amplify the voltage produced when the high voltage supplies 52, 54 draw a current through a resistor. The high voltage return circuits then pass this signal to the A/D converter 60 (which has four inputs for this purpose). When requested by the microcontroller 44, the A/D converter 60 produces a serial data stream that corresponds to the voltage level produced by the high voltage return circuit. The microcontroller 44 then compares these values with the programmed values and makes adjustments to the digital potentiometers discussed above.

Ion balance of the emitter module 24 is performed using a sensor antenna 66, an amplifier 68 (such as one having a gain of 34.2), a level adjuster (not shown), and the A/D converter 60. The sensor antenna 66 is placed between the positive and negative emitters 62, 64, such as equidistant therebetween. If there is an imbalance in the emitter module 24, a charge will build up on the sensor antenna 66. The built-up charge is amplified by the amplifier 68. The amplified signal is level shifted to match the input range of the A/D converter 60, and is then passed to the A/D converter 60 for use by the microcontroller 44.

A communication circuit disposed between the microcontroller 44 and the system controller 28 includes a miswire protection circuit 70 and a RS-485 encoder/decoder 72.

The miswire protection circuit allows the emitter module 24 to function normally even if an installer accidentally inverts (i.e., flips or reverses) the wiring connections when attaching the connectors to the communication/power line 26. When the emitter module 24 is first powered on, the microcontroller 44 sets two switches on and reads the RS-485 line. From this initial reading, the microcontroller 44 determines if the communication/power line 26 is in an expected state. If the communication/power line 26 is in the expected state and remains in the expected state for a predetermined period of time, then the communication lines of the communication/power line 26 is not flipped and program in the microcontroller 44 proceeds to the next step. However, if the line is opposite the expected state, then switches associated with the miswire protection circuit 70 are reversed to electronically flip the communication lines of the communication/power line 26 to the correct position. Once the communication/power line 26 is corrected, then the path for the system controller 28 to communicate with the emitter module 24 is operational. A full-wave bridge is provided to automatically orient the incoming power to the proper polarity.

Figure 5:
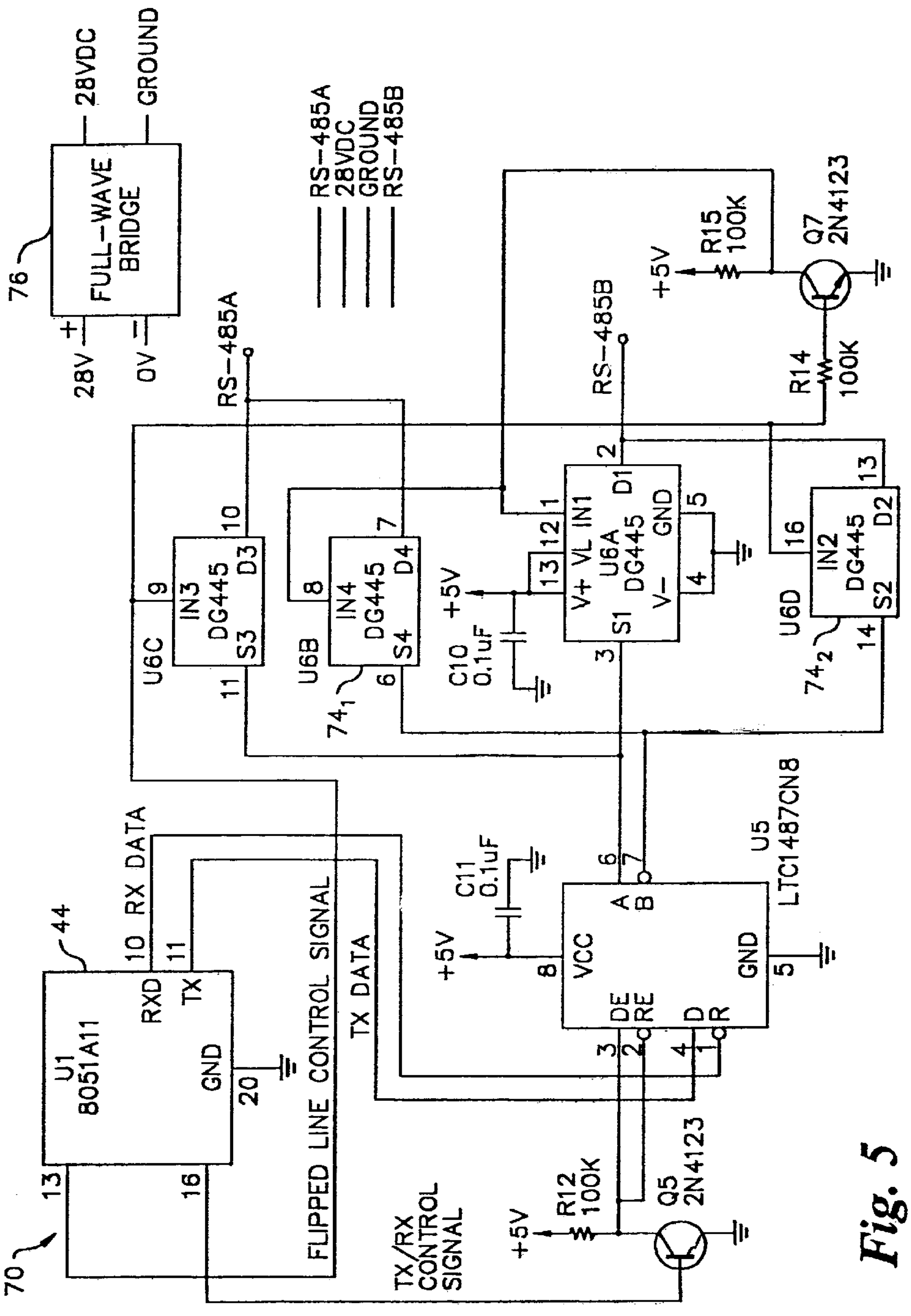
FIG. 5 is a circuit level diagram of a miswire protection circuit associated with FIG. 4.

FIG. 5 is a circuit level diagram of the miswire protection circuit 70. Reversing switches $74_1$ and $74_2$ electronically flip the communication line, and full-wave bridge 76 flips the power lines. In one preferred four wire ordering scheme, the two RS-485 communication lines are on the outside, and the two power lines are on the inside.

Referring again to FIG. 4, when the system controller 28 attempts to communicate with an individual emitter module 24, the first byte sent is the "address." At this time, the microcontroller 44 in the emitter module 24 needs to retrieve the "address" from the emitter module address circuit. The "address" of the emitter module is set at the installation by adjustment of two rotary encoder switches 90 located on the emitter module 24. The microcontroller 44 gets the address from the rotary encoder switches 90 and a serial shift register 92. The rotary encoder switches 90 provide seven binary data lines to the serial shift register 92. When needed, the microcontroller 44 shifts in the switch settings serially to determine the "address" and stores this within its memory.

The emitter module 24 includes an IR receive circuit 94 which includes an IR receiver 96, an IR decoder 98, and the two rotary encoder switches 90. When an infrared signal is received, the IR receiver 96 strips the carrier frequency off and leaves only a serial data stream which is passed to the IR decoder 98. The IR decoder 98 receives the data and compares the first five data bits with the five most significant data bits on the rotary encoder switches 90. If these data bits match, the IR decoder 98 produces four parallel data lines and one valid transmission signal which are input into the microcontroller 44.

The emitter module 24 also includes a watchdog timer 100 to reset the microcontroller 44 if it gets lost.

The emitter module 24 further includes a switching power supply 102 which receives between 20–28 VDC from the system controller 28 and creates +12 VDC, +5 VDC, −5 VDC, and ground. As discussed above, a switching power supply was selected because of the need to conserve power due to possible long wire runs which cause large voltage drops.

Figure 9:
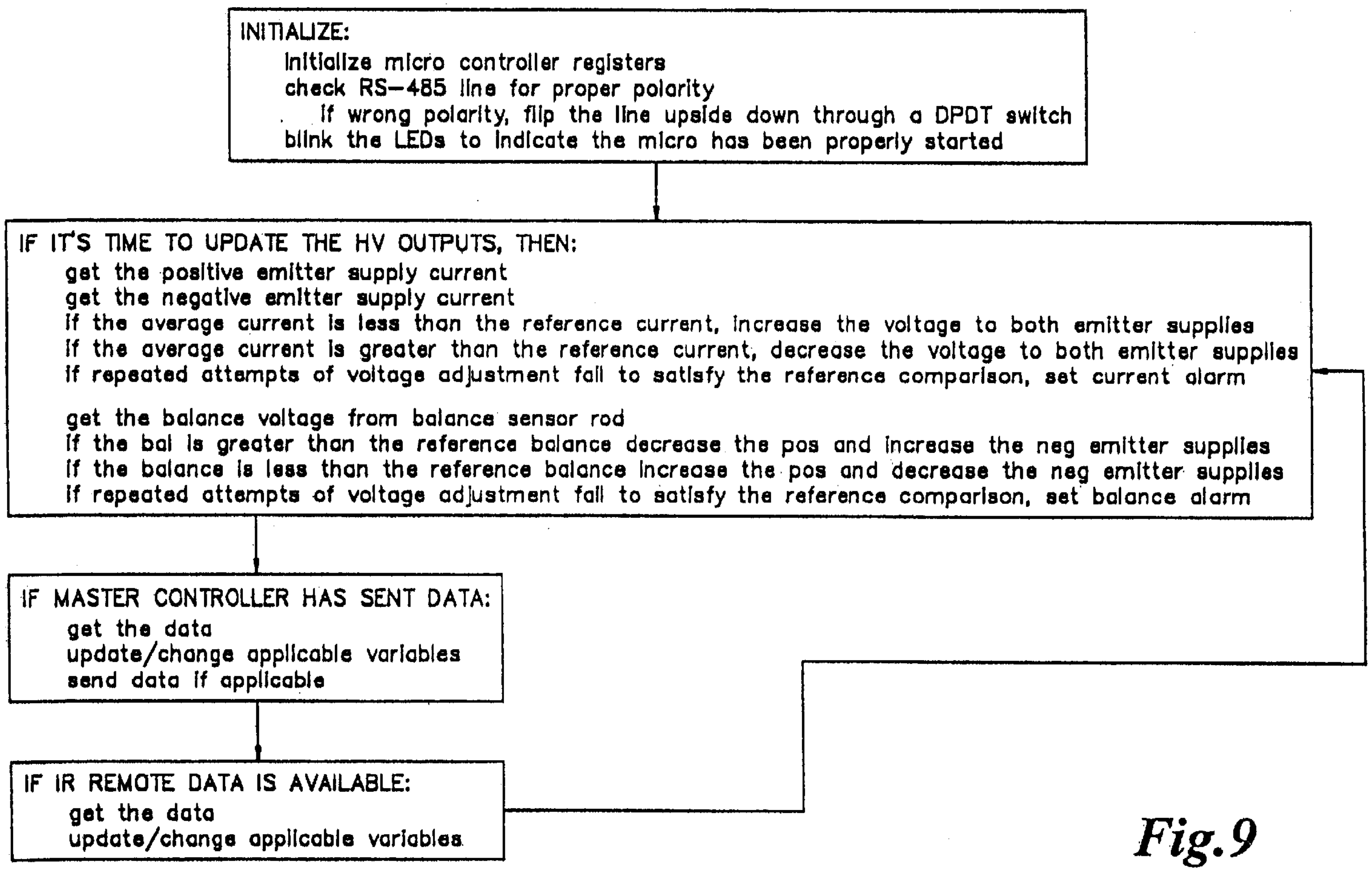
FIG. 9 is a flowchart of the software associated with a microcontroller of the emitter module of FIG. 4.

FIG. 9 is a self-explanatory flowchart of the software associated with the emitter module's microcontroller 44.

Figure 6:
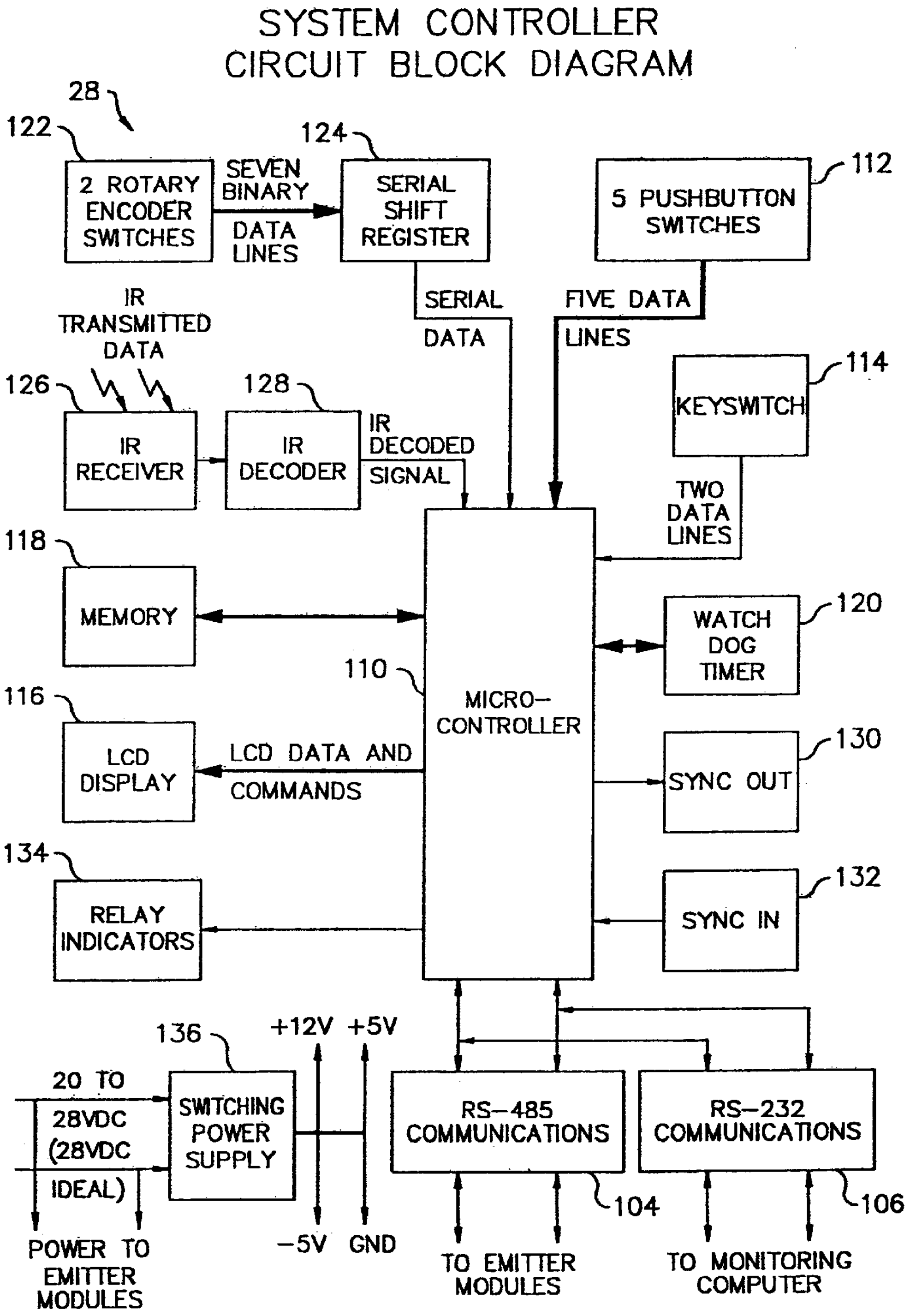
FIG. 6 is a schematic block diagram of a system controller for the room ionization system of FIG. 2.

FIG. 6 is a schematic block diagram of the system controller 28. The system controller 28 performs at least three basic functions; communicate with the emitter modules 24, communicate with an external monitoring computer (not shown), and display data. The system controller 28 communicates with the emitter modules 24 using RS-485 communications 104, and can communicate with the monitoring computer using RS-232 communications 106. The system controller 28 includes a microcontroller 110, which can be a microprocessor. Inputs to the microcontroller 110 include five pushbutton switches 112 and a keyswitch 114. The pushbutton switches 112 are used to scroll through an LCD display 116 and to select and change settings. The keyswitch 114 is used to set the system into a standby, run or setup mode.

The system controller 28 also includes memory 118 and a watchdog timer 120 for use with the microcontroller 110. A portion of the memory 118 is an EEPROM which stores $C_{REF}$ and $B_{REF}$ for the emitter modules 24, as well as other system configuration information, when power is turned off or is disrupted. The watchdog timer 120 detects if the system controller 28 goes dead, and initiates resetting of itself.

To address an individual emitter module 24, the system controller 28 further includes two rotary encoder switches 122 and a serial shift register 124 which are similar in operation to the corresponding elements of the emitter module 24.

During set up of the system 22, each emitter module 24 is set to a unique number via its rotary encoder switches 90. Next, the system controller 28 polls the emitter modules $24_1$–$24_n$ to obtain their status-alarm values. In one polling embodiment, the system controller 28 checks the emitter modules 24 to determine if they are numbered in sequence, without any gaps. Through the display 116, the system controller 28 displays its finding and prompts the operator for approval. If a gap is detected, the operator may either renumber the emitter modules 24 and redo the polling, or signal approval of the existing numbering. Once the operator signals approval of the numbering scheme, the system controller 28 stores the emitter module numbers for subsequent operation and control. In an alternative embodiment of the invention, the system controller 28 automatically assigns numbers to the emitter modules 24, thereby avoiding the necessity to set switches at every emitter module 24.

As discussed above, the remote control transmitter 30 may send commands directly to the emitter modules 24 or may send the commands through the system controller 28. Accordingly, the system controller 28 includes an IR receiver 126 and an IR decoder 128 for this purpose.

The system controller 28 also includes synchronization links, sync in 130 and sync out 132. These links allow a plurality of system controllers 28 to be daisy-chained together in a synchronized manner so that the firing rate and phase of emitter modules 24 associated with a plurality of system controllers 28 may be synchronized with each other. Since only a finite number of emitter modules 24 can be controlled by a single system controller 28, this feature allows many more emitter modules 24 to operate in synchronized manner. In this scheme, one system controller 28 acts as the master, and the remaining system controllers 28 act as slave controllers.

The system controller 28 may optionally include relay indicators 134 for running alarms in a light tower or the like. In this manner, specific alarm conditions can be visually communicated to an operator who may be monitoring a stand-alone system controller 28 or a master system controller 28 having a plurality of slave controllers.

The system controller 28 houses three universal input AC switching power supplies (not shown). These power supplies produce an isolated 28 VDC from any line voltage between 90 and 240 VAC and 50–60 Hz. The 28 VDC (which can vary between 20–30 VDC) is distributed to the remote modules 24 for powering the modules. Also, an onboard switching power supply 136 in the system controller 28 receives the 28 VDC from the universal input AC switching power supply, and creates +12 VDC, +5 VDC, −5 VDC, and ground. A switching power supply is preferred to preserve power.

Figure 10:
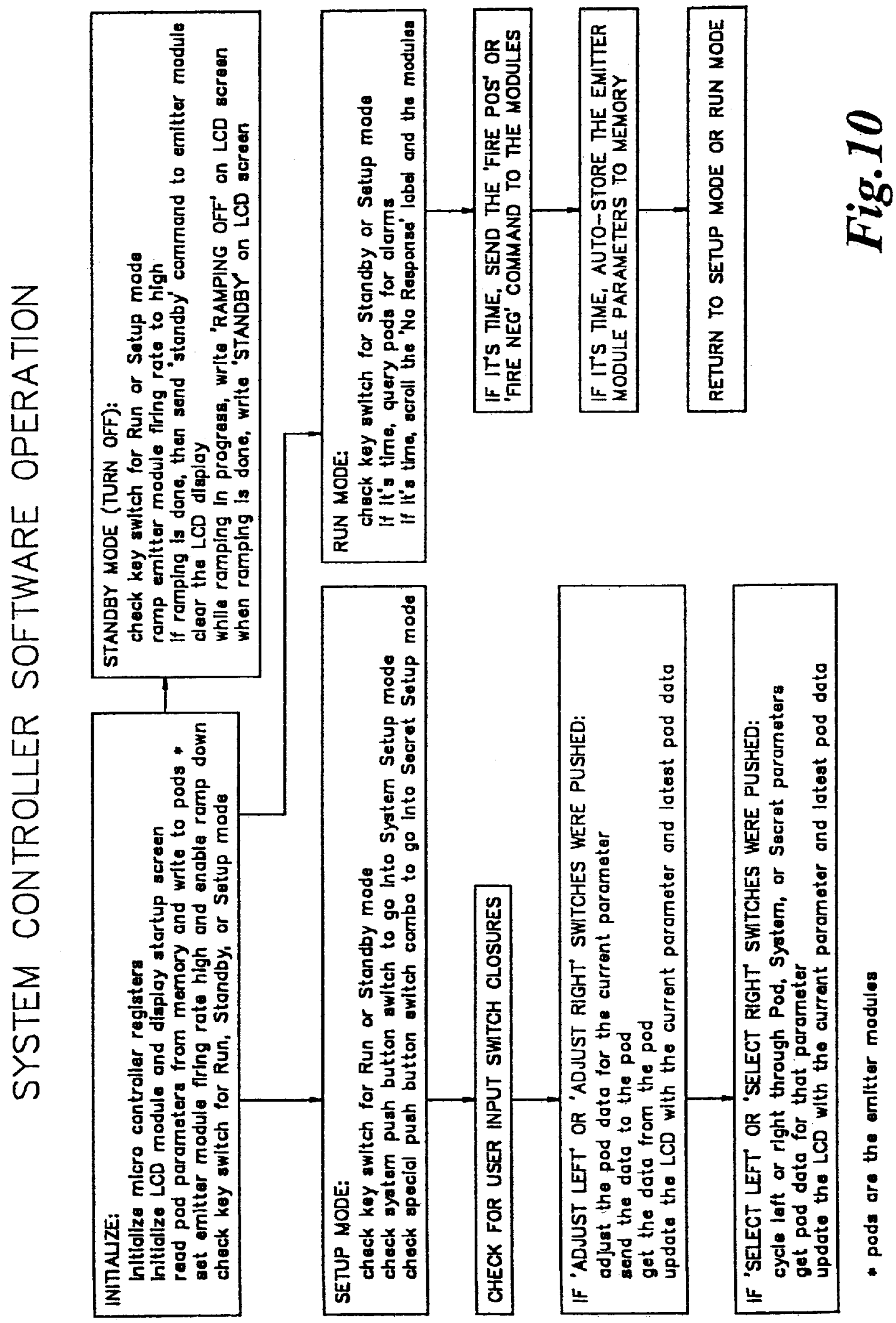
FIG. 10 is a flowchart of the software associated with a microcontroller of the system controller of FIG. 6.

FIG. 10 is a self-explanatory flowchart of the software associated with the system controller's microcontroller 110.

Figure 7A:
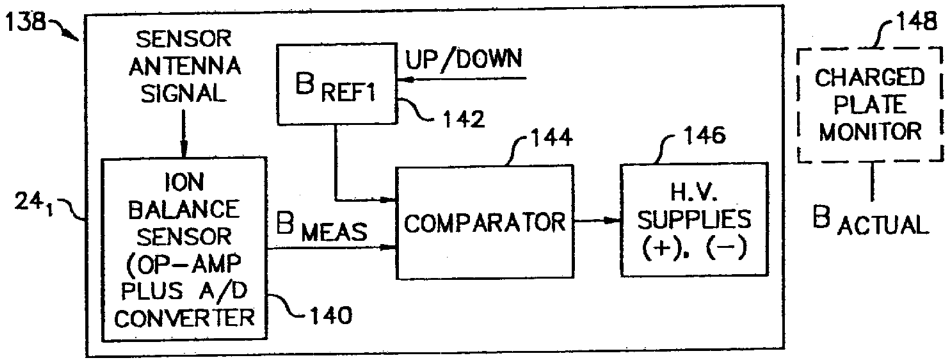
FIG. 7A is a schematic block diagram of a balance control scheme for the emitter module of FIG. 4.

FIG. 7A is a schematic block diagram of a balance control circuit 138 of an emitter module $\mathbf{24}_1$. An ion balance sensor 140 (which includes an op-amp plus an A/D converter) outputs a balance measurement, $B_{MEAS}$, taken relatively close to the emitters of the emitter module $\mathbf{24}_1$. The balance reference value 142 stored in the microcontroller 44, $B_{REF1}$, is compared to $B_{MEAS}$ in comparator 144. If the values are equal, no adjustment is made to the positive or negative high voltage power supplies 146. If the values are not equal, appropriate adjustments are made to the power supplies 146 until the values become equal. This process occurs continuously and automatically during operation of the emitter module $\mathbf{24}_1$. During calibration or initial setup, balance readings are taken from a charged plate monitor to obtain an actual balance reading, $B_{ACTUAL}$, in the work space near the emitter module $\mathbf{24}_1$. If the output of the comparator shows that $B_{REF1}$ equals $B_{MEAS}$, and if $B_{ACTUAL}$ is zero, then the emitter module $\mathbf{24}_1$ is balanced and no further action is taken. However, if the output of the comparator shows that $B_{REF1}$ equals $B_{MEAS}$, and if $B_{ACTUAL}$ is not zero, then the emitter module $\mathbf{24}_1$ is unbalanced. Accordingly, $B_{REF1}$ is adjusted up or down by using either the remote control transmitter 30 or the system controller 28 until $B_{ACTUAL}$ is brought back to zero. Due to manufacturing tolerances and system degradation over time, each emitter module 24 will thus likely have a different $B_{REF}$ value.

Figure 7B:
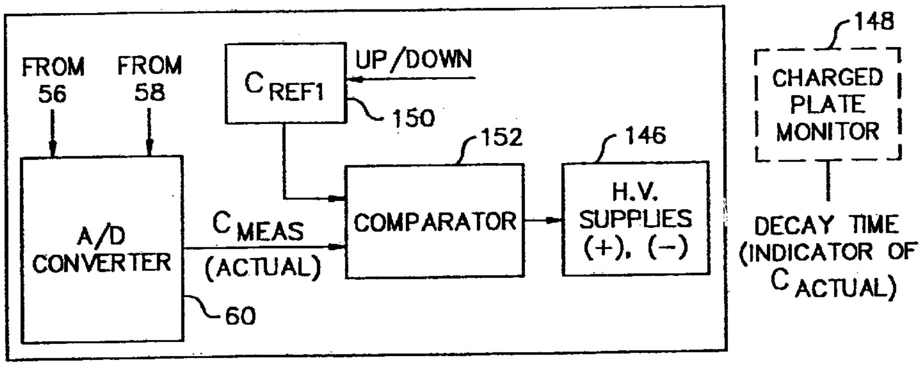
FIG. 7B is a schematic block diagram of a current control scheme for the emitter module of FIG. 4.

FIG. 7B is a scheme similar to FIG. 7A which is used for the ion current, as discussed above with respect to $C_{REF}$ and $C_{MEAS}$. In FIG. 7B, $C_{MEAS}$ is the actual ion output current, as directly measured using the circuit elements 56, 58 and 60 shown in FIG. 4. Comparator 152 compares $C_{REF1}$ (which is stored in memory 150 in the microcontroller 44) with $C_{MEAS}$. If the values are equal, no adjustment is made to the positive or negative high voltage power supplies 146. If the values are not equal, appropriate adjustments are made to the power supplies 146 until the values become equal. This process occurs continuously and automatically during operation of the emitter module $\mathbf{24}_1$. During calibration or initial setup, decay time readings are taken from a charged plate monitor 148 to obtain an indication of the actual ion output current, $C_{MEAS}$, in the work space near the emitter module $\mathbf{24}_1$. If the decay time is within a desired range, then no further action is taken. However, if the decay time is too slow or too fast, $C_{REF1}$ is adjusted upward or downward by the operator. The comparator 152 will then show a difference between $C_{MEAS}$ and $C_{REF1}$, and appropriate adjustments are automatically made to the power supplies 146 until these values become equal in the same manner as described above.

As discussed above, conventional automatic balancing systems have hardware-based feedback systems, and suffer from at least the following problems:

(1) Such systems cannot provide very fine balance control, since feedback control signals are fixed based upon hardware component values.

(2) The overall range of balance control is limited based upon the hardware component values.

(3) Quick and inexpensive modifications are difficult to make, since the individual components are dependent upon each other for proper operation.

Conventional ion current control circuitry suffers from the same problems. In contrast to conventional systems, the software-based balance and ion current control circuitry of the present invention do not suffer from any of these deficiencies.

Figure 8:
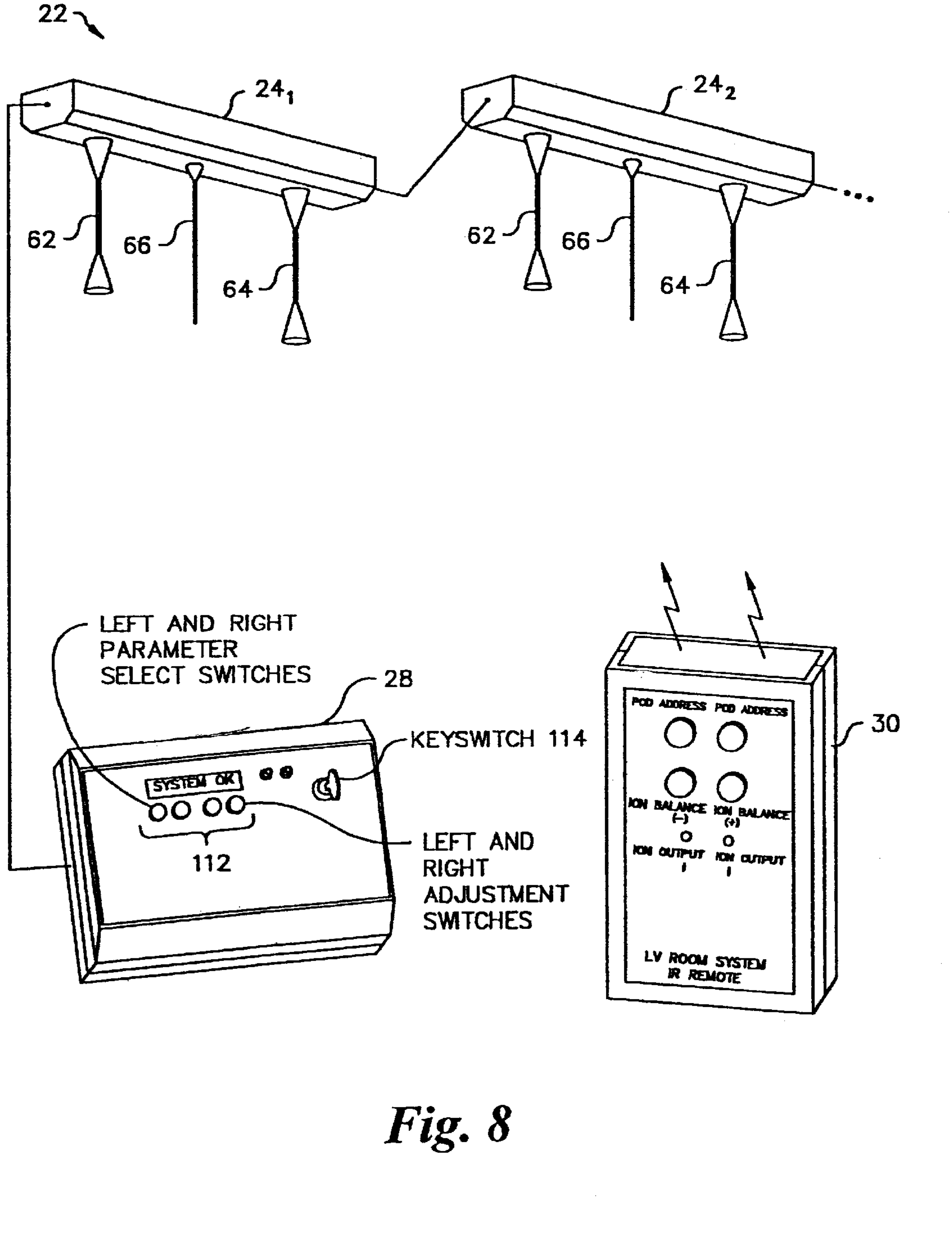
FIG. 8 is a perspective view of the hardware components of the system of FIG. 2.

FIG. 8 shows a perspective view of the hardware components of the system 22 of FIG. 2.

The microcontrollers 44 and 110 allow sophisticated features to be implemented, such as the following features:

(1) The microprocessor monitors the comparators used for comparing $B_{REF}$ and $B_{MEAS}$, and $C_{REF}$ and $C_{MEAS}$. If the differences are both less than a predetermined value, the emitter module 24 is presumed to be making necessary small adjustments associated with normal operation. However, if one or both of the differences are greater than a predetermined value at one or more instances of time, the emitter module 24 is presumed to be in need of servicing. In this instance, an alarm is sent to the system controller 28.

(2) Automatic ion generation changes and balance changes for each individual emitter module 24 may be ramped up or ramped down to avoid sudden swings or potential overshoots. For example, when using the pulse DC mode, the pulse rate (i.e., frequency) may be gradually adjusted from a first value to the desired value to achieve the desired ramp up or down effect. When using either the pulse DC mode or the steady-state DC mode, the DC amplitude may be gradually adjusted from a first value to the desired value to achieve the desired ramp up or down effect.

The scope of the present invention is not limited to the particular implementations set forth above. For example, the communications need not necessarily be via RS-485 or RS-232 communication/power lines. In particular, the mis-wire protection circuitry may be used with any type of communication/power lines that can be flipped via switches in the manner described above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A circuit for changing the relative position of wired electrical lines which are in a fixed relationship to each other, the wired electrical lines including a first communication line with a first voltage and a second communication line with a second voltage, the circuit comprising:

(a) a first switch associated with the first communication line, the first switch having a first, initial position and a second position which is opposite of the first, initial position;

(b) a second switch associated with the second communication line, the second switch having a first, initial position and a second position which is opposite of the first, initial position; and (c) a processor having an output control signal connected to the first and second switches for causing the first and second switches to be placed in their respective first or second position, wherein the first and second communication lines have a first configuration when both are in their first, initial position and a second configuration when both are in their second position, the processor generating an initial control signal to set the first and second switches in their first position and including means for determining if the first and second communication lines are in an expected state and remain in the expected state for a predetermined period of time, the processor maintaining the first and second switches in the first position if the first and second communication lines are initially in the expected state and remain in the expected state for the predetermined period of time, the processor generating a second control signal to set the first and second switches in their second position if the first and second communication lines are not in the expected state for the predetermined period of time, the expected state being defined as one of the first voltage and the second voltage being generally less than the other voltage by a minimum predetermined difference voltage.

2. A circuit according to claim 1 wherein the wired electrical lines further comprise:

(d) a first and a second power line having a potential therebetween, the first and second power lines being in a fixed relationship to each other and to the first and second communication lines, and (e) a full-wave bridge connected to the first and the second power lines for automatically switching the polarity of the first and second power lines upon detection of improper polarity of the first and second power lines.

3. A circuit according to claim 2 wherein the electrical lines include a flat wire of adjacent electrical lines, and the first and the second communication lines are outer electrical lines of the flat wire and the first and second power lines are inner electrical lines of the flat wire.

4. A circuit according to claim 1 wherein the electrical lines include a flat wire of adjacent electrical lines, and the first and the second communication lines are outer electrical lines of the flat wire.

* * * * *